(12) United States Patent
Yamaguchi et al.

(10) Patent No.: US 6,693,144 B1
(45) Date of Patent: Feb. 17, 2004

(54) GRAFT COPOLYMER AND SOLVENT-BASED WATER-AND OIL-REPELLANT COMPOSITION COMPRISING THE SAME

(75) Inventors: Fumihiko Yamaguchi, Settsu (JP); Makoto Hanazawa, Settsu (JP); Kazunori Hayashi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/148,398

(22) PCT Filed: Nov. 28, 2000

(86) PCT No.: PCT/JP00/08369

§ 371 (c)(1),
(2), (4) Date: May 30, 2002

(87) PCT Pub. No.: WO01/40373

PCT Pub. Date: Jun. 7, 2001

(30) Foreign Application Priority Data

Dec. 2, 1999 (JP) ............................ 11-343225

(51) Int. Cl.$^7$ ................................. C08K 5/09
(52) U.S. Cl. ................ 524/284; 524/533; 524/544; 524/545; 526/245; 526/247
(58) Field of Search ................ 524/284, 545, 524/544, 533; 526/245, 247

(56) References Cited

U.S. PATENT DOCUMENTS

| | | | | |
|---|---|---|---|---|
| 5,536,304 A | * | 7/1996 | Coppens et al. | 252/8.57 |
| 5,576,095 A | * | 11/1996 | Ueda et al. | 442/80 |
| 6,177,531 B1 | * | 1/2001 | Shimada et al. | 526/245 |
| 6,225,405 B1 | * | 5/2001 | Yamaguchi et al. | 525/55 |
| 6,376,592 B1 | * | 4/2002 | Shimada et al. | 524/457 |
| 6,379,753 B1 | * | 4/2002 | Soane et al. | 427/434.2 |

FOREIGN PATENT DOCUMENTS

| | | |
|---|---|---|
| JP | 61-50082 | 11/1986 |
| JP | 6-228534 | 8/1994 |
| JP | 7-18035 | 1/1995 |
| JP | 8-157684 | 6/1996 |
| JP | 9-95516 | 4/1997 |
| JP | 9-118876 | 5/1997 |
| JP | 2000-160148 | 6/2000 |

OTHER PUBLICATIONS

International Search Report for PCT/JP00/08369, dated Feb. 6, 2001.
English Translation of International Preliminary Examination Report for PCT/JP00/08369 dated Oct. 30, 2001.

* cited by examiner

*Primary Examiner*—David W. Wu
*Assistant Examiner*—Henry S. Hu
(74) *Attorney, Agent, or Firm*—Sughrue Mion, PLLC

(57) ABSTRACT

A solvent-based water- and oil-repellent agent composition, which contains a graft copolymer having a repeating unit derived from a vinyl monomer having a perfluoroalkyl group and a repeating unit derived from a polymerizable cyclic acid anhydride and an organic solvent, has high product stalibity and high dilution stability and can give high water- and oil-repellency.

11 Claims, No Drawings

GRAFT COPOLYMER AND SOLVENT-BASED WATER-AND OIL-REPELLANT COMPOSITION COMPRISING THE SAME

FIELD OF THE INVENTION

The present invention relates to a graft copolymer, and a solvent-based water- and oil-repellent composition comprising the same.

RELATED ART

In view of regulation of fluorocarbons and environmental problems, solvents for water- and oil-repellent products, for example, halogen solvents such as R113 are being replaced by petroleum solvents. However, problems such as solidification or precipitation of products at low temperature arise even if the solvent is merely replaced. When the water- and oil-repellent product is diluted with the petroleum solvent having low solubility such as solvent having a small content of an aromatic compound, problems such as precipitation or concentration distribution arise.

When the fluorine concentration in an active component of the water- and oil-repellent agent is reduced to impart high product stability and high dilution stability to the water- and oil-repellent agent composition, the water- and oil-repellency is lowered.

Japanese Patent Kokoku Publication No. 50082/1986 discloses a water- and oil-repellent agent comprising a graft copolymer obtained by the graft copolymerization which utilizes the reactivity of an OH group. However, the graft copolymer is insufficient in water repellency because a hydroxyl group remains in the polymer.

Japanese Patent Kokai Publication No. 228534/1994 discloses a water- and oil-repellent agent comprising a fluorine-containing graft copolymer. However, the fluorine-containing graft copolymer is insufficient in solubility in the petroleum solvent because a repeating unit derived from a fluorine-containing monomer is contained in only a trunk polymer of the graft copolymer.

Japanese Patent Kokai Publication No. 95516/1997 discloses a water- and oil-repellent agent comprising a copolymer of a perfluoroalkyl vinyl monomer containing an acid anhydride. However, the solubility is insufficient unless a fluorine content is low, because the copolymer is not a graft polymer.

SUMMARY OF THE INVENTION

An object of the present invention is to give a water- and oil-repellent agent having the improved water- repellency (particularly, to cellulose fibers such as cotton fibers) and the improved solubility in a petroleum solvent (particularly nonaromatic solvents).

The present inventors discovered that both of the improved solubility of a water- and oil-repellent agent in petroleum solvents due to high solubility possessed by an acid anhydride structure and the improved water repellency caused by the improved adhesion to fibers due to polarity possessed by the acid anhydride structure (interaction between the acid anhydride structure and a hydroxyl group of cellulose fibers such as cotton fibers) can be imparted to a solvent-based water- and oil-repellent agent by introducing the acid anhydride structure into a graft copolymer.

The present invention provides a solvent-based water- and oil-repellent agent composition comprising a graft copolymer comprising a repeating unit derived from a vinyl monomer having a perfluoroalkyl group and a repeating unit derived from a polymerizable cyclic acid anhydride, and an organic solvent.

The present invention also provides a graft copolymer comprising a repeating unit derived from a vinyl monomer having a perfluoroalkyl group and a repeating unit derived from a polymerizable cyclic acid anhydride.

DETAILED EXPLANATION OF THE INVENTION

For example, the graft copolymer has a trunk polymer comprising:

(A) optionally present, a vinyl monomer having a perfluoroalkyl group,
(B) optionally present, a fluorine-free vinyl monomer,
(C) optionally present, a polymerizable cyclic acid anhydride, and
(D) a vinyl monomer having a group bonding to a branch polymer, and a branch polymer comprising:
(E) optionally present, a vinyl monomer having a perfluoroalkyl group,
(F) optionally present, a fluorine-free vinyl monomer, and
(G) optionally present, a polymerizable cyclic acid anhydride, wherein at least one of the components (A) and (E) is an essential component, and at least one of the components
(C) and (G) is an essential component.

Examples of the graft copolymer include the followings:
(i) a graft copolymer having a trunk polymer comprising the vinyl monomer having the perfluoroalkyl group (A) and the polymerizable cyclic acid anhydride (C) and a branch polymer comprising the vinyl monomer having the perfluoroalkyl group (E) and the polymerizable cyclic acid anhydride (G);
(ii) a graft copolymer having a trunk polymer comprising the vinyl monomer having the perfluoroalkyl group (A) but no polymerizable cyclic acid anhydride (C) and a branch polymer comprising the polymerizable cyclic acid anhydride (G) but no vinyl monomer having the perfluoroalkyl group (E);
(iii) a graft copolymer having a trunk polymer comprising the polymerizable cyclic acid anhydride (C) but no vinyl monomer having the perfluoroalkyl group (A) and a branch polymer comprising the vinyl monomer having the perfluoroalkyl group (E) but no polymerizable cyclic acid anhydride (G);
(iv) a graft copolymer having a trunk polymer comprising the vinyl monomer having the perfluoroalkyl group (A) and the polymerizable cyclic acid anhydride (C) and a branch polymer comprising the vinyl monomer having the perfluoroalkyl group (E) but no polymerizable cyclic acid anhydride (G);
(v) a graft copolymer having a trunk polymer comprising the polymerizable cyclic acid anhydride (C) but no vinyl monomer having the perfluoroalkyl group (A) and a branch polymer comprising the vinyl monomer having the perfluoroalkyl group (E) and the polymerizable cyclic acid anhydride (G);
(vi) a graft copolymer having a trunk polymer comprising the vinyl monomer having the perfluoroalkyl group (A) but no polymerizable cyclic acid anhydride (C) and a branch polymer comprising the vinyl monomer having the perfluoroalkyl group (E) and the polymerizable cyclic acid anhydride (G);

(vii) a graft copolymer having a trunk polymer comprising the vinyl monomer having the perfluoroalkyl group (A) and the polymerizable cyclic acid anhydride (C) and a branch polymer comprising the polymerizable cyclic acid anhydride (G) but no vinyl monomer having the perfluoroalkyl group (E);

(viii) a graft copolymer having a trunk polymer comprising the vinyl monomer having the perfluoroalkyl group (A) and the polymerizable cyclic acid anhydride (C) and a branch polymer comprising the fluorine-free monomer (F) but no polymerizable cyclic acid anhydride (G) and no vinyl monomer having the perfluoroalkyl group (E); and (ix) a graft copolymer having a trunk polymer comprising the fluorine-free vinyl monomer (B) but no vinyl monomer having the perfluoroalkyl group (A) and no polymerizable cyclic acid anhydride (C) and a branch polymer comprising the polymerizable cyclic acid anhydride (G) and the vinyl monomer having the perfluoroalkyl group (E).

The perfluoroalkyl group-containing vinyl monomers (A) and (D), which constitutes the trunk polymer and/or branch polymer, may be a (meth)acrylate having a perfluoroalkyl group.

The perfluoroalkyl group-containing (meth)acrylate may be represented by the following general formula:

wherein Rf is a perfluoroalkyl group having 3 to 21 carbon atoms, $R^{18}$ is hydrogen or a methyl group, and $A^2$ is a divalent organic group.

Examples of the perfluoroalkyl group-containing (meth) acrylate include:

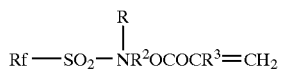

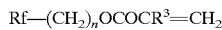

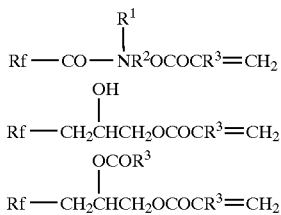

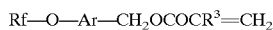

wherein Rf is a perfluoroalkyl group having 3 to 21 carbon atoms, $R^1$ is hydrogen or an alkyl group having 1 to 10 carbon atoms, $R^2$ is an alkylene group having 1 to 10 carbon atoms, $R^3$ is hydrogen or a methyl group, Ar is arylene group which optionally has a substituent group, and n is an integer of 1 to 10.

Specific examples of the perfluoroalkyl group-containing (meth)acrylate include the following.

$CF_3(CF_2)_7(CH_2)OCOCH=CH_2$,
$CF_3(CF_2)_6(CH_2)OCOC(CH_3)=CH_2$,
$(CF_3)_2CF(CF_2)_6(CH_2)_2OCOCH=CH_2$,
$CF_3(CF_2)_7(CH_2)_2OCOC(CH_3)=CH_2$,
$CF_3(CF_2)_7(CH_2)_2OCOCH=CH_2$,
$CF_3(CF_2)_7SO_2N(CH_3)(CH_2)_2OCOCH=CH_2$,
$CF_3(CF_2)_7SO_2N(C_2H_5)(CH_2)_2OCOC(CH_3)=CH_2$,
$(CF_3)_2CF(CF_2)_6CH_2CH(OCOCH_3)CH_2OCOC(CH_3)=CH_2$,
$(CF_3)_2CF(CF_2)_8CH_2CH(OH)CH_2OCOCH=CH_2$,
$CF_3[C_6F_{10}(CF_2)_2]SO_2N(CH_3)(CH_2)_2OCOCH=CH_2$

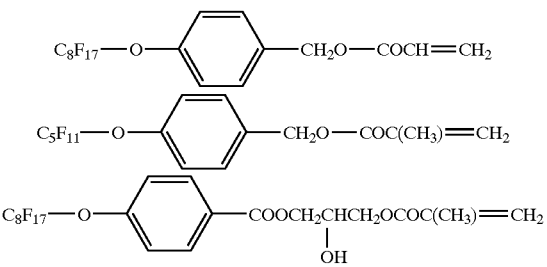

As a matter of course, at least two types of the fluoroalkyl group-containing (meth)acrylates can be used in combination.

The vinyl monomer having the perfluoroalkyl group may be another fluorine-containing monomer. Examples of the another fluorine-containing monomer include a fluorinated olefin (having, for example, 3 to 20 carbon atoms) such as $CF_3(CF_2)_7CH=CH_2$.

Examples of the fluorine-free vinyl monomer (B) and (F) include a (meth)acrylate ester. The (meth)acrylate ester may be an ester between (meth)acrylic acid and an aliphatic alcohol such as a monohydric alcohol and a polyhydric alcohol (such as divalent alcohol).

Examples of the fluorine-free vinyl monomer include: (meth)acrylates such as 2-ethylhexyl (meth)acrylate, cyclohexyl (meth)acrylate, lauryl (meth)acrylate, stearyl (meth)acrylate, hydroxyalkyl (meth)acrylate, tetrahydrofurfuryl (meth)acrylate, polyoxyalkylene (meth)acrylate, 3-chloro-2-hydroxypropyl (meth)acrylate, glycidyl (meth)acrylate, N,N-dimethylaminoethyl (meth)acrylate, N,N-diethylaminoethyl (meth)acrylate, benzyl (meth)acrylate, glycidyl methacrylate, hydroxypropyl monomethacrylate, 2-hydroxy-3-phenoxypropyl acrylate, 2-hydroxyethyl acrylate, glycerol monomethacrylate, β-acryloyloxyethyl hydrogen succinate, β-methacryloyloxyethyl- hydrogen phthalate, 2-acryloyloxyethylhexahydrophthalic acid, 2-acryloyloxyethylphthalic acid, 2-acryloyloxyethyl-2-hydroxyethylphthalic acid, methacrylic acid hydroxypropyltrimethylammonium chloride, dimethylarninoethyl methacrylate, diethylaminoethyl methacrylate, 2-acryloyloxyethyl dihydrogen phosphate, glycosyl ethyl methacrylate, methacrylamide, 2-hydroxy-3-acryloyloxypropyl methacrylate, 2-methacryloyloxyethyl acid phosphate, and hydroxypivalic acid neopentyl glycol diacrylate; styrenes such as styrene and p-isopropylstyrene; (meth)acrylamides such as (meth)acrylamide, diacetone (meth)acrylamide, N-methylol(meth)acrylamide, N-butoxymethylacrylamide, and 2-acrylamide-2-methylpropanesulfonic acid; and vinyl ethers such as vinyl alkyl ether.

Examples thereof further include ethylene, butadiene, vinyl acetate, chloroprene, vinyl halide such as vinyl chloride, vinylidene halide, acrylonitrile, vinyl alkyl ketone, N-vinylcarbazole, vinyl pyrrolidone, and (meth)acrylic acid.

The fluorine-free vinyl monomer may be a silicon-containing monomer (for example, (meth)acryloyl group-containing alkylsilane, (meth)acryloyl group-containing alkoxysilane, and (meth)acryloyl group-containing polysiloxane).

Examples of the silicon-containing monomer include: (meth)acryloxytrialkylsilane, (meth)acryloxytrialkoxysilane, (meth)acryloxypolysiloxane, (meth)acryloxypropyltrialkylsilane, (meth)acryloxypropyltrialkoxysilane, (meth)acryloxypropylpolysiloxane, allyltrialkylsilane, allyltrialkoxysilane, allylpoly-siloxane, vinyltrialkylsilane, vinyltrialkoxysilane, and vinylpolysiloxane.

The (meth)acryloxypropylpolysiloxane may be

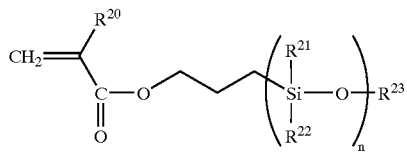

wherein $R^{20}$ is H or $CH_3$, $R^{21}$ is H or $CH_3$, $R^{22}$ is H or $CH_3$, $R^{23}$ is H or $CH_3$, and n is from 1 to 100 (for example, (meth)acryloxypropylpolydimethylsiloxane).

At least two types of the fluorine-free vinyl monomers can be also used in combination.

The polymerizable cyclic acid anhydrides (C) and (G) may be a compound having a carbon-carbon double bond copolymerizable with the vinyl monomer (for example, the perfluoroalkyl group-containing and/or fluorine-free vinyl monomer), and at least one intramolecular cyclic carboxylic anhydride structure in one molecule. The carbon-carbon double bond in the polymerizable cyclic acid anhydrides (C) and (G) may be inside or outside of a cyclic carboxylic anhydride structure ring.

The polymerizable cyclic acid anhydrides (C) and (G) having the carbon-carbon double bond inside of the cyclic carboxylic anhydride structure ring may be, for example, a compound of the formula:

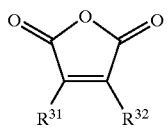

wherein $R^{31}$ and $R^{32}$ are independently a hydrogen atom or a saturated hydrocarbon group having 1 to 10 carbon atoms, and $R^{31}$ and $R^{32}$ may be combined to form a substituted or unsubstituted ring having 4 to 30 carbon atoms.

Specific examples include maleic anhydride ($R^{31}$=H and $R^{32}$=H) and citraconic anhydride ($R^{31}$=H and $R^{32}$=$CH_3$).

The polymerizable cyclic acid anhydrides (C) and (G) having the carbon-carbon double bond outside of the cyclic carboxylic anhydride structure ring may be, for example, a compound of the formula:

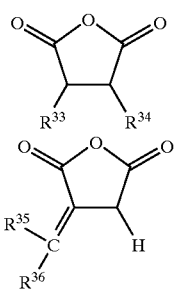

-continued

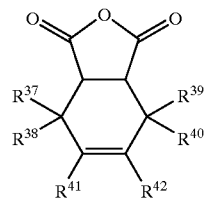

wherein $R^{33}$ and $R^{34}$ are combined to form a substituted (for example, with a methyl group or a cyclic anhydride group) or unsubstituted ring having a carbon-carbon double bond and 4 to 30 carbon atoms,
$R^{35}$ and $R^{36}$ are a hydrogen atom or a saturated hydrocarbon group (such as an alkyl group) having 1 to 10 carbon atoms, $R^{37}$, $R^{38}$, $R^{39}$, $R^{40}$, $R^{41}$ and $R^{42}$ are independently a chlorine atom, a hydrogen atom or a saturated hydrocarbon group (such as an alkyl group) having 1 to 10 carbon atoms, and $R^{37}$ and $R^{39}$ may be combined to form a substituted (for example, with a halogen atom) or unsubstituted divalent saturated hydrocarbon group having 1 to 10 carbon atoms.

Specific examples of the polymerizable cyclic acid anhydrides (C) and (G) are as follows:

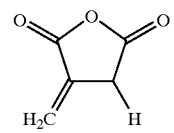

[Itaconic anhydride]

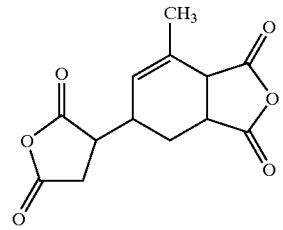

[Maleated methylcyclohexane tetrabasic acid anhydride]

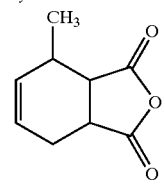

[Methyltetrahydrophthalic anhydride]

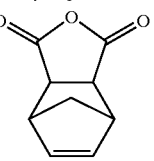

[Endomethylenetetrahydrophthalic anhydride]

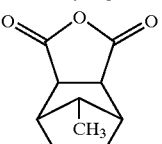

[Methylendomethylenetetrahydrophthalate anhydride]

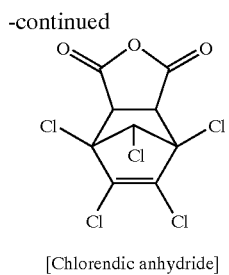

[Chlorendic anhydride]

The polymerizable cyclic acid anhydrides (C) and (G) are preferably a compound having a carbon-carbon double bond and one intramolecular cyclic carboxylic anhydride structure, for example, maleic anhydride.

The bonding group in the vinyl monomer (D) having the group bonding to the branch polymer may be an NCO group, a glycidyl group, an acid chloride group and/or a halomethyl group.

The vinyl monomer (D) having the group bonding to the branch polymer may be an isocyanate group, glycidyl group or acid chloride group-containing vinyl monomer. The isocyanate group (NCO), the glycidyl group or the acid chloride group is reacted with the active hydrogen group of the branch polymer so that the trunk polymer is bonded to the branch polymer.

The term "isocyanate group-containing vinyl monomer" means a compound having a carbon-carbon double bond and an isocyanate group. Generally, the numbers of the carbon-carbon double bonds and of the isocyanate groups in the isocyanate group-containing vinyl monomer are one. A molecule of the isocyanate group-containing vinyl monomer usually has a carbon-carbon double bond at one terminal of the molecule and an isocyanate group at the other terminal of the molecule.

The isocyanate group-containing vinyl monomer includes, for example, (i) an isocyanate group-containing (meth)acrylate ester, (ii) a vinyl isocyanate represented by the formula:

$$H_2C=C(R^{11})-A^1-NCO$$

wherein $R^{11}$ is H or a linear, branched or cyclic hydrocarbon group (for example, an alkyl group) having 1 to 20(for example, 1 to 10) carbon atoms and $A^1$ is a direct bond or a hydrocarbon group having 1 to 20 carbon atoms, and (iii) a reaction product of (iii-1) a compound having two isocyanate groups and (iii-2) a compound having a carbon-carbon double bond and active hydrogen.

Examples of the isocyanate group-containing (meth)acrylate ester (i) include:

$$H_2C=C(R^{12})COO(CH_2CH_2O)_n(CH_2)_m-NCO$$

wherein $R^{12}$ is H or $CH_3$, n is from 0 to 20, and m is from 1 to 20(for example, 2-isocyanatoethyl (meth)acrylate).

Examples of the vinyl isocyanate (ii) include:

$$H_2C=C(R^{13})-NCO$$

wherein $R^{13}$ is a linear, branched or cyclic hydrocarbon group (for example, an alkyl group or a cyclohexyl group) having 1 to 20(for example, 1 to 10) carbon atoms, $$H_2C=C(R^{14})-(CH_2)_n-NCO$$

wherein $R^{14}$ is H or a linear, branched or cyclic hydrocarbon group (for example, an alkyl group or a cyclohexyl group) having 1 to 20(for example, 1 to 10) carbon atoms, and n is from 2 to 20, and $$H_2C=C(R^{15})-Ph-C(R^{16})_2-NCO$$

wherein $R^{15}$ is H or $CH_3$, $R^{16}$ is H or $CH_3$, and Ph is a phenylene group.

Examples of the compound having two isocyanate groups (iii-1) include 2,4-tolylene diisocyanate, 2,6-tolylene diisocyanate, diphenylmethane diisocyanate, naphthalene diisocyanate, hexamethylene diisocyanate, xylene diisocyanate, and isophorone diisocyanate.

Examples of the compound having the carbon-carbon double bond and active hydrogen (iii-2)(hereinafter referred to as a "monomer having active hydrogen") include:

hydroxyethyl (meth)acrylate, $$HO(CH_2CH_2O)_nCOC(R^{17})=CH_2$$

wherein $R^{17}$ is H or $CH_3$ and n is from 2 to 20, and aminoethyl (meth)acrylate.

The reaction between the compound having two isocyanate groups (iii-1) and the monomer having active hydrogen (iii-2) may be conducted in a solvent (especially, an aprotic solvent, for example, an ester solvent) optionally using a catalyst such as dibutyltin dilaurate. The amount of the monomer having active hydrogen (iii-2) in the reaction may be from 1.0 to 2.0 equivalents, and preferably from 1.0 to 1.7 equivalents, based on the compound having two isocyanate groups (iii-1).

Examples of the vinyl monomer having the glycidyl group include glycidyl (meth)acrylate.

Examples of the vinyl monomer having the acid chloride group include (meth)acryloyl chloride.

When the group bonding to the branch polymer is the isocyanate group, the glycidyl group or the acid chloride group, the branch polymer may be formed from the above-mentioned monomer and a chain transfer agent. The active hydrogen group of the branch polymer reacting with the group (that is, the isocyanate group, the glycidyl group or the acid chloride group), bonding to the branch polymer, of the trunk polymer is an active hydrogen group of the chain transfer agent bonding to one terminal of the branch polymer.

The chain transfer agent may be a chain transfer agent having an active hydrogen group at both terminals, for example, an alkylenethiol chain transfer agent having an active hydrogen group or an aryl chain transfer agent having an active hydrogen group. Examples of the active hydrogen group include OH, $NH_2$, $SO_3H$, NHOH, COOH, and SH. The number of carbon atoms of the alkylene group of the alkylenethiol may be from 1 to 20.

Examples of the alkylenethiol chain transfer agent include the followings.

$HS(CH_2)_nOH$ [n is 2, 4, 6 or 11],
$HSCH_2COOH$,
$HSCH_2CH(CH_3)COOH$,
$HSCH_2CH_2SO_3Na$,
$HSCH_2CH_2SO_3H$, and

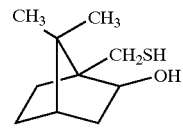

Examples of the allyl chain transfer agent include the followings.

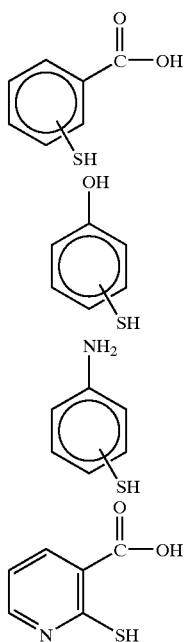

For example, when the group bonding to the branch polymer is the NCO group, the active hydrogen group of the chain transfer agent reacts with an isocyanate group of the trunk polymer to form a —NH—C(=O)— linkage (an amide linkage). When the active hydrogen group is a OH group, it forms a urethane linkage (—NH—C(=O)—O—). When the active hydrogen group is a NH$_2$ group, it forms a urea group (—NH—C(=O)—NH—).

The amount of the chain transfer agent may be at most 0.7 mol, for example from 0.05 to 0.7 mol, particularly from 0.1 to 0.5 mol, based on 1 mol of the branch monomer. The chain transfer agent may be bonded at one terminal of the branch polymer obtained by polymerizing the branch monomer. The chain transfer agent can control the length of a chain of the branch polymer.

The vinyl monomer (D) having the group bonding to the branch polymer may be a vinyl monomer having a halomethyl group (—CH$_2$X (X: a halogen atom)). The trunk polymer can bond to the branch polymer by substituting the halogen atom of the halomethyl group with the branch polymer.

The halomethyl group-containing monomer may be a monomer having the halomethyl group and a styrene group.

The halomethyl group-containing monomer may be a compound represented by the formula:

wherein R is —CH$_3$ or H,
R' is a direct bond or C$_{1-3}$ alkylene group, and
X is a halogen atom.

Examples of the halomethyl group-containing monomer include chloromethylstyrene, bromomethylstyrene and 1-chloroethylstyrene. A halogen atom in the halomethyl group is preferably a chlorine atom.

The trunk polymer and/or the branch polymer preferably has at least two repeating unit. The trunk polymer and/or the branch polymer may be a block polymer or a random polymer.

The total amount of the perfluoroalkyl group-containing vinyl monomers (A) and (B) may be from 10 to 75 parts by weight, for example, from 10 to 65 parts by weight, the total amount of the fluorine-free vinyl monomers (B) and (F) may be from 0 to 89.8 parts by weight, for example, from 0 to 89 parts by weight, particularly from 1 to 50 parts by weight, the amount of the vinyl monomer (D) having the group bonding to the branch polymer may be from 0.1 to 10 parts by weight, for example from 1 to 10 parts by weight, and the total amount of the polymerizable cyclic acid anhydrides (C) and (G) may be from 0.1 to 89.9 parts by weight, for example, from 0.1 to 50 parts by weight, based on 100 parts by weight of the graft copolymer.

The weight ratio of the trunk polymer to the branch polymer may be from 5:95 to 95:5, preferably from 10:90 to 90:10, particularly from 30:70 to 70:30.

The trunk polymer may have 0 to 75 parts by weight, for example, 0 to 65 parts by weight, particularly 1 to 50 parts by weight of the repeating unit derived from the perfluoroalkyl group-containing vinyl monomer (A), based on 100 parts by weight of the trunk polymer.

The trunk polymer may have 0.1 to 89.9 parts by weight, for example, 0.1 to 50 parts by weight of the repeating unit derived from the polymerizable cyclic acid anhydride (C), based on 100 parts by weight of the trunk polymer.

The branch polymer may have 0 to 75 parts by weight, for example, 0 to 65 parts by weight, particularly 1 to 50 parts by weight of the repeating unit derived from the perfluoroalkyl group-containing vinyl monomer (E), based on 100 parts by weight of the branch polymer.

The branch polymer may have 0 to 75 parts by weight, for example, 0 to 50 parts by weight of the repeating unit derived from the polymerizable cyclic acid anhydride (G), based on 100 parts by weight of the branch polymer.

The graft copolymer may have an number average molecular weight of 5,000 to 200,000, preferably 5,000 to 100,000(measured by GPC in THF, in terms of styrene).

A method of synthesizing the graft copolymer includes a graft polymerization method of a macromonomer; a method of reacting a branch polymer having an active hydrogen group at one terminal, which is polymerized by using a chain transfer agent having an active hydrogen group, with a trunk polymer having a group (an NCO group, a glycidyl group and an acid chloride group) reactive with active hydrogen;

a method which comprises generating a living free radical in a trunk polymer having a halomethyl group by a metal halide catalyst, and replacing a halogen atom with a branch polymer, such as an ATRP (Atomic Transfer Radical Polymerization) method; and a method of polymerizing a branch monomer by using a chain transfer initiator species such as a free radical, a cationically active species, an anionically active species and a hydroperoxide in a trunk polymer (cf. Japanese Patent Kokoku Publication 50082/1986). In view of a molecular design for adjusting to various applications, preferable are the graft polymerization which can easily control a polymerization degree of a branch polymer; the method of reacting a branch polymer having an active hydrogen group at one terminal, which is polymerized by using a chain transfer agent having an active hydrogen group, with a trunk polymer having a group (an NCO group, a glycidyl group and an acid chloride group) reactive with active hydrogen; and the method which comprises generating a living free radical in a trunk polymer having a halomethyl group by a metal halide catalyst and replacing a halogen atom with a branch polymer, such as an ATRP method.

The preparation of the graft copolymer according to the present invention can be conducted in any of the following methods (A) and (B), when, for example, the group bonding to the branch polymer is an NCO group, a glycidyl group or an acid chloride group.

(A) a method of copolymerizing a macromonomer, which is obtained by reacting, with a branch polymer, a vinyl monomer having a group bonding to the branch polymer, and a copolymerizable monomer (a trunk monomer) to form a trunk polymer (a method of polymerizing a trunk monomer in the presence of a branch polymer), and (B) a method of reacting a trunk polymer, which is obtained by copolymerizing a vinyl monomer having a group bonding to a branch polymer and a copolymerizable monomer, with the branch polymer (a method of separately polymerizing a branch polymer and a trunk polymer).

The method (A) comprises the steps of:

(A-1) polymerizing a monomer (branch monomer) and optionally a chain transfer agent, which are constituent components of a branch polymer, to give a branch polymer;

(A-2) reacting the resultant branch polymer with a vinyl monomer having a group bonding to the branch polymer to give a macromonomer; and (A-3) polymerizing the macromonomer and a trunk monomer to give a graft copolymer.

The method (B) comprises the steps of:

(B-1) polymerizing a vinyl monomer having a group bonding to a branch polymer and a copolymerizable monomer, which are constituent components of a trunk polymer, to give a trunk polymer having the group bonding to the branch polymer; and (B-2) grafting a separately synthesized branch polymer onto the resultant trunk polymer to give a graft copolymer.

The polymerization step (A-1) of the branch polymer and the polymerization steps (A-3) and (B-1) of the trunk polymer may be conducted in a solvent at a temperature of 70 to 80° C. using a polymerization initiator. The polymerization time is generally from 2 to 12 hours.

The reaction steps (A-2) and (B-2) of reacting the active hydrogen group of the chain transfer agent constituting the branch polymer with the isocyanate group contained in the monomer constituting the trunk polymer may be conducted in a solvent at a temperature of 30 to 65° C. The polymerization time is generally from 2 to 24 hours.

As the polymerization initiator, for example, azobisisobutyronitrile, benzoyl peroxide, di-tert-butyl peroxide, lauryl peroxide, cumene hydroperoxide, tert-butyl peroxide pivalate, and diisopropylperoxy dicarbonate are used. The amount of the polymerization initiator is preferably from 1 to 10 parts by weight based on 100 parts by weight of the monomer.

The polymerization solvent may be a polar solvent, a hydrocarbon solvent, or a mixture of these solvents. When the group bonding to the branch polymer exists in the reaction system (namely, in the steps (A-2), (B-1) and (B-2)), a protic solvent having an active hydrogen group such as alcohol solvent can not be used.

When the group bonding to the branch polymer is a halomethyl group, the preparation of the graft copolymer can be conducted as follows.

(C-1) A halomethyl group-containing monomer (for example, chloromethylstyrene), other monomers, a solvent and a polymerization initiator are used to prepare a trunk polymer. The solvent is a halogen-free organic solvent. Examples of the solvent for preparing the trunk polymer are the same as examples of a solvent for the preparation of the branch polymer discussed hereinafter. Typical example of conditions for the polymerization of the trunk polymer is a polymerization temperature of 110° C. and a polymerization time of 4 hours. Conventional polymerization initiator such as a peroxide can be used as the polymerization initiator.

(C-2) A branch monomer and a metal halide catalyst are added to the trunk polymer to give a graft copolymer in which the branch polymer bonds to the trunk polymer.

In the reaction procedure (C-2), the branch polymer is bonded to the trunk polymer by using reactivity of the halomethyl group (—$CH_2X$ (X: halogen atom)) in the trunk polymer. It is believed that a living free radical is generated by the metal halide catalyst and a halogen atom in the halomethyl group of the trunk polymer is replaced with the branch polymer. Such reaction procedure is referred to as "ATRP (Atomic Transfer Radical Polymerization) method" or "ATRA (Atom Transfer Radical Addition) method", which are disclosed in, for example, J. S. Wang and K. Matyjaszewsky, Macromolecules, 28, 7572(1955).

A halogen atom in the metal halide used as the catalyst is preferably chlorine. Examples of the metal in the metal halide are copper (Cu) and a transition metal of VIII group, for example, iron (Fe) and ruthenium (Ru). Examples of the metal halide are $CuCl$, $CuCl_2$, $FeCl_2$, $NiCl_2$ and $RuCl_2$. The addition amount of the metal halide (for example, CuCl) may be from 0.1 to 5 mol, preferably from 0.5 to 1.5, more preferably from 0.8 to 1.2 mol, based on 1 mol of the halomethyl group-containing monomer (for example, chloromethylstyrene).

A solubilizing agent or dispersing agent (that is, accelerating agent) for metal halide is preferably used. The accelerating agent is preferably a compound which coordinates the metal halide to give a ligand and increases the solubility of the metal halide in a polymerization solvent. Examples of the accelerating agent are an organic nitrogen-containing compound and an organic phosphorus-containing compound. Examples of the organic nitogen-containing compound (for example, an amine) are bipyridyl (2,2'-dipyridine), a derivative of 2,2'-dipyridine such as 4,4'-bis (5-nonyl)-2,2'-dipyridine, triphenylamine, quinoline, tetramethylene diamine, trialkyl amine having $C_{2-10}$ alkyl groups, 1,10-phenanthroline, and a compound of the formula: $(CH_3)_2N(C_2H_4N(CH_3))_nCH_3$(wherein n=1, 2 or 3). Examples of the organic phosphorus-containing compound are $P(C_6H_5)_3$, $P(OC_6H_5)_3$, $P(C_2H_5)_3$ and $P(OC_2H_5)_3$. The amount of the accelerating agent may be at most 10 mol, for example, from 0.5 to 8 mol, preferably from 1 to 4 mol, more preferably from 1.8 to 3 mol, based on 1 mol of the metal halide.

A temperature of ATRP reaction for forming the branch polymer may be from 50 to 250° C., preferably from 60 to 200° C., more preferably from 80 to 150° C. A reaction time may at most 24 hours, for example, from 1 to 12 hours.

The reaction is preferably conducted in the presence of a solvent. Various fluorine-free solvents can be used as the solvent. A hydrocarbon solvent, a polar solvent and a mixture thereof are preferably used.

The polar solvent is a solvent having a polar group in a molecule. Examples of the polar group include a hydroxyl group, a carboxyl group, an ester group, an acyl group, and an ether oxygen group. Examples of the polar solvent include an alcohol solvent, a glycol solvent, an ester solvent, and a ketone solvent.

The hydrocarbon solvent may be a solvent which is composed only of carbon and hydrogen. The hydrocarbon solvent may be an aliphatic hydrocarbon. Examples of the hydrocarbon solvent include n-heptane, n-hexane, n-octane, cyclohexane, methylcyclohexane, cyclopentane, methylcyclopentane, methylpentane, 2-ethylpentane, isoparaffin hydrocarbon, liquid paraffin, decane, undecane, dodecane, mineral spirit, and mineral turpentine. In some case, an aromatic solvent may be used.

Examples of the alcohol solvent include butyl alcohol and isopropyl alcohol. Examples of the glycol solvent include propylene glycol monomethyl ether, propylene glycol monoethyl ether, dipropylene glycolmonomethyl ether, dipropylene glycol monoethyl ether, and acetate thereof. Examples of the ester solvent include a monobasic acid ester such as methyl acetate, ethyl acetate, and butyl acetate; and a dibasic acid ester such as diethyl succinate, diethyl adipate, dibutyl phthalate, and dioctyl phthalate. Examples of the ketone solvent include methyl isobutyl ketone (MIBK), methyl ethyl ketone, and acetone.

A mixture of the hydrocarbon solvent and the polar solvent may also be used. The weight ratio of the hydrocarbon solvent to the polar solvent may be from 100:0 to 0:100, for example 5:95 to 95:5.

An organic solvent solution of the graft copolymer is a solvent-based water- and oil-repellent agent composition.

The water- and oil-repellent agent composition of the present invention may contain other water- and oil-repellent agents and additives, for example, softening agents, antistatic agents, cross-linking agents and crease-proofing agents, if necessary.

A substrate to be treated with the water- and oil-repellent agent composition of the present invention includes various substances. Examples of the substrate to be treated include textiles, glass, papers, woods, hides, furs, asbestos, bricks, cements, metals and oxides, ceramics, plastics, coated surfaces, and plasters. Examples of the textiles include animal- and vegetable-origin natural fibers such as cotton, hemp, wool, and silk; synthetic fibers such as polyamide, polyester, polyvinyl alcohol, polyacrylonitrile, polyvinyl chloride, and polypropylene; semisynthetic fibers such as rayon and acetate, etc.; and a mixture of these fibers. The water- and oil-repellent agent composition of the present invention can be applied to the substrate by a method of applying the composition onto the surface of the substrate to be treated using a known process such as dip coating, and then drying the composition.

The water- and oil-repellent agent composition of the present invention can also be used, for example, as an aerosol by adding propellants. Examples of preferred propellant include fluoroalkane or chlorofluoroalkane having 1 or 2 carbon atoms, LPG gas, dimethyl ether, nitrogen gas, and carbon dioxide gas. Typical examples of the fluoroalkane or chlorofluoroalkane having 1 or 2 carbon atoms include dichlorodifluoromethane, trichlorotrifluoroethane, chlorodifluoromethane, chlorodifluoroethane, dichlorotrifluoroethane, tetrafluoroethane, and a mixture of at least two types of them. The amount of the propellant is preferably 0.05 to 2 times as much as the total weight of the surface treatment agent composition containing the solvent.

A container having a mechanism for spraying out a liquid contained in the container, for example, an aerosol container or a spray container is filled with the aerosol.

PREFERRED EMBODIMENTS OF THE INVENTION

The present invention will be illustrated by the following Examples which do not limit the present invention.

Characteristics were determined as follows.

Water- and Oil-repellency

A polymer solution is diluted with a mineral spirit so that a solid content of the diluted solution is 0.8% by weight, and then sprayed over a cloth using a hand spray so that the cloth is sufficiently wetted. As the cloth, a polyester cloth, a polyester/cotton mixed spun cloth and a cotton cloth are used. After drying at room temperature for 10 hours, the water repellency and oil repellency are evaluated in the following procedures.

The water repellency is expressed by the water repellency No. (cf. the following Table 1) determined by the spray method according to JIS (Japanese Industrial Standard)-L-1092(1998).

The oil repellency is determined by dropping several drops of a test solution shown in Table 2 onto two positions on the surface of a test cloth and then observing the penetration state of the drops after 30 seconds, according to AATCC-TM118.

TABLE 1

| Water repellency No. | State |
| --- | --- |
| 5 | No wet on the surface |
| 4 | Slight wet on the surface |
| 3 | Partial wet on the surface |
| 2 | Wet on the surface |
| 1 | Wet over the whole surface |

TABLE 2

| Oil repellency | Test solution | Surface tension (dyne/cm, 25° C.) |
| --- | --- | --- |
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | n-Hexadecane/Nujol (35/65 by weight) | 29.6 |
| 1 | Nujol | 31.2 |
| 0 | Inferior to 1 | — |

Product Stability

After adjusting the concentration of the polymer solution to 15% by weight by using a petroleum solvent, the polymer solution is stored at −5° C. for one month. It is evaluated whether or not solidification or precipitation occurs. The evaluation is conducted by dissolving the polymer in mineral spirit for "in aromatic-containing solvent" and in n-decane for "in nonaromatic solvent".

○: Homogeneous liquid is maintained.

X: Solidification or precipitation occurs.

Dilution Stability

The polymer solution is diluted with n-decane so that the solid content of the diluted solution is 0.8% by weight, and then stored at −5° C. for one month. It is evaluated whether or not solidification or precipitation occurs.

○: Homogeneous and transparent liquid is maintained.

Δ: Some turbidity occurs, but homogeneous liquid is maintained for practical use.

X: Solidification or precipitation occurs.

SYNTHESIS EXAMPLE 1

Synthesis of Isocyanate Group-containing Vinyl Monomer

In a 500 mL three-necked flask equipped with a dropping funnel, 100 g of 2,4-tolylene diisocyanate, 100 g of ethyl acetate, and 0.1 g dibutyltin dilaurate were charged. While shaking at 60 to 65° C., 90 g of hydroxyethyl methacrylate, and 90 g of ethyl acetate were added dropwise through the dropping funnel over 15 minutes and the mixture was reacted for 8 hours to give an isocyanate group-containing vinyl monomer (a) shown below:

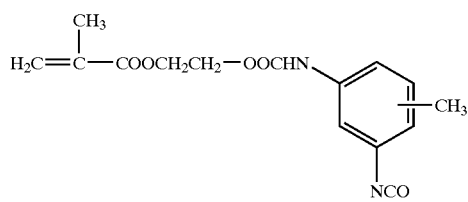

EXAMPLE 1

In a 1,000 mL glass polymerization reactor, the following ingredients were charged and reacted in a nitrogen atmosphere at 75° C. for 8 hours while shaking to give a branch polymer.

| | |
|---|---|
| Mercaptoethanol | 3 g |
| $CF_3CF_2(C_2F_4)_nC_2H_4OCOCH=CH_2$ (FA) [n = 3.5 in average] | 95 g |
| Stearyl methacrylate (StMA) | 5 g |
| Azoisobutyronitrile | 0.17 g |
| Ethyl acetate | 120 g |

After the completion of the reaction, a gas chromatography analysis revealed that 100% of monomers were consumed. An NMR analysis revealed that a composition ratio (molar ratio) of the respective ingredients in the polymer, namely, a ratio of mercaptoethanol:FA:StMA was 1.0:4.8:0.8.

After reducing the temperature to 55 to 60° C., 9 g of 2-isocyanatoethyl methacrylate was charged in an air atmosphere and the reaction was conducted at 55 to 60° C. for 8 hours while shaking to give a macromonomer. After the completion of the reaction, an absorption peak of a NCO group of an IR spectrum nearly disappeared.

To the macromonomer, the following ingredients were added and the reaction was conducted in a nitrogen atmosphere at 75° C. for 8 hours while shaking to give a graft copolymer.

| | |
|---|---|
| 2-Ethylhexyl methacrylate (2-EHMA) | 100 g |
| Maleic anhydride (MAN) | 10 g |

| -continued | |
|---|---|
| Ethyl acetate | 515 g |
| tert-Butyl peroxypivalate (PERBUTYL PV, manufactured by NOF Corp.) | 9 g |

After the completion of the reaction, a gas chromatography analysis revealed that 100% of monomers were consumed. A GPC revealed that a number average molecular weight of the resultant polymer was 8,000.

The water- and oil-repellency, the product stability and the dilution stability of the resultant polymer solution were determined. The results are shown in Table 10.

EXAMPLE 2

In the same manner as in Example 1, except that 38 g of the solution (50% by weight) of isocyanate group-containing vinyl monomer (a) prepared in Synthesis Example 1 was used instead of of 2-isocyanatoethyl methacrylate, the synthesis was conducted.

In the preparation of each of the branch polymer and the graft polymer, 100% of monomers were consumed. An NMR analysis revealed that a composition ratio (molar ratio) of respective ingredients in the branch polymer was mercaptoethanol:FA:StMA=1.0:4.7:0.6.

After the completion of the reaction for preparing a macromonomer, an NCO absorption of an IR spectrum nearly disappeared. A GPC revealed that a number average molecular weight of the resultant graft polymer was 8,000.

The water- and oil-repellency, the product stability and the dilution stability of the resultant graft polymer solution were determined. The results are shown in Table 10.

EXAMPLES 3 to 6

The same procedure as in Example 1 was repeated, except that the monomers shown in Table 3 were used.

In the preparation of each of the branch polymer and the graft polymer, 100% of monomers were consumed. An NMR analysis revealed that a composition ratio (molar ratio) of respective ingredients was mercaptoethanol:FA:2-EHMA=1.0:5.2:1.8 in Example 4, mercaptoethanol:FA:MAN=1.0:5.0:1.2 in Example 5, and mercaptoethanol:FA:StMA=1.0:5.8:1.9 in Example 6.

After the completion of the reaction for preparing a macromonomer, an NCO absorption of an IR spectrum nearly disappeared. A GPC revealed that a number average molecular weight of the resultant graft polymers was 9,300 in Example 3; 8,900 in Example 4; 8,600 in Example 5; and 8,200 in Example 6.

The water- and oil-repellency, the product stability and the dilution stability of the resultant polymer solutions were determined. The results are shown in Table 10.

TABLE 3

| | Branch polymer | | | | | | Trunk polymer | | |
|---|---|---|---|---|---|---|---|---|---|
| | Macromonomer | | | | | | | | |
| | Mercapto-ethanol | FA | StMA | 2-EHMA | MAN | 2-Isocyanatoethyl methacrylate | Isocyanate group-containing vinyl monomer (a) | FA | 2-EHMA | MAN |
| Ex. 1 | 3 | 95 | 5 | — | — | 9 | — | — | 100 | 10 |
| Ex. 2 | 3 | 95 | 5 | — | — | — | 38 | — | 100 | 10 |
| Ex. 3 | 3 | 95 | 5 | — | — | 9 | — | — | 106 | 4 |
| Ex. 4 | 3 | 95 | — | 5 | — | 9 | — | — | 100 | 10 |
| Ex. 5 | 3 | 95 | — | — | 5 | 9 | — | — | 105 | 5 |
| Ex. 6 | 3 | 90 | 10 | — | — | 9 | — | 5 | 95 | 10 |

EXAMPLE 7

The following ingredients were charged into a 1000 mL glass polymerization reactor and reacted at 75° C. for 8 hours in a nitrogen atmosphere with shaking. Ethyl acetate was distilled off to give a branch polymer.

| | |
|---|---|
| Mercaptoacetic acid | 3 g |
| FA | 95 g |
| Stearyl methacrylate (StMA) | 5 g |
| Asoisobutyronitrile | 0.09 g |
| Ethyl acetate | 120 g |

In the preparation of the branch polymer, a monomer consumption ratio determined by a gas chromatography was 100%. An NMR analysis revealed that a composition ratio (molar ratio) of respective ingredients in the polymer was mercaptoethanol:FA:StMA=1.0:6.1:1.3.

To a solution of branch polymer containing 150 g of methyl isobutyl ketone, added were 5 g of glycidyl methacrylate (GMA) and 1 g of N,N-dimethyllaurylamine in an air atomosphere. The reaction was conducted at 100° C. for 10 hours with shaking to give a macromonomer. After the reaction, a consumption ratio of glycidyl methacrylate determined by a gas chromatography was 100%.

Then, the following ingredients were added to the macromonomer and reacted at 75° C. for 8 hours in a nitrogen atmosphere with shaking to give a graft copolymer.

| | |
|---|---|
| 2-Ethylhexyl methacrylate (2-EHMA) | 100 g |
| Maleic anhydride (MAN) | 10 g |
| Methyl isobutyl ketone | 465 g |
| tert-Butyl peroxypivalate (PERBUTYL PV, manufactured by NOF Corp.) | 9 g |

After the completion of the reaction, a monomer consumption ratio determined by a gas chromatography was 100%. A GPC revealed that a number average molecular weight of the resultant polymer was 9,400.

The water- and oil-repellency, the product stability and the dilution stability of the resultant polymer solution were determined. The results are shown in Table 10.

EXAMPLES 8 to 10

Monomers shown in Table 4 were polymerized in the same manner as in Example 7.

A monomer consumption ratio in the preparation of each of a branch polymer and a graft copolymer was 100%. An NMR analysis revealed that a composition ratio (molar ratio) of respective ingredients in the polymer was mercaptoacetic acid:FA:2-EHMA=1.0:6.5:2.1 in Example 8, mercaptoacetic acid:FA:MAN=1.0:6.9:1.6 in Example 9, and mercaptoacetic acid:FA:StMA=1.0:7.1:2.2 in Example 10.

After the completion of the reaction, a monomer consumption ratio of glycidyl methacrylate determined by a gas chromatography was 100%. A GPC revealed that a number average molecular weight of the resultant polymers was 9,300 in Example 8, 8,900 in Example 9, and 8,600 in Example 10.

The water- and oil-repellency, the product stability and the dilution stability of the resultant polymer solutions were determined. The results are shown in Table 10.

TABLE 4

| | Branch polymer | | | | | | | Trunk polymer | | |
|---|---|---|---|---|---|---|---|---|---|---|
| | Macromonomer | | | | | | | | | |
| | Mercaptoacetic acid | FA | StMA | 2-EHMA | MAN | GMA | FA | 2-EHMA | MAN |
| Ex. 7 | 3 | 95 | 5 | — | — | 5 | — | 100 | 10 |
| Ex. 8 | 3 | 95 | — | 5 | — | 5 | — | 100 | 10 |

TABLE 4-continued

| | Used ingredients (g) | | | | | | | | |
|---|---|---|---|---|---|---|---|---|---|
| | Branch polymer | | | | | Trunk polymer | | | |
| | Macromonomer | | | | | | | | |
| | Mercaptoacetic acid | FA | StMA | 2-EHMA | MAN | GMA | FA | 2-EHMA | MAN |
| Ex. 9 | 3 | 95 | — | — | 5 | 5 | — | 106 | 4 |
| Ex. 10 | 3 | 90 | 10 | — | — | 5 | 5 | 95 | 10 |

EXAMPLE 11

(First Step: Polymerization of Trunk Polymer)

The following ingredients were charged into a 500 mL glass polymerization reactor and reacted at 80° C. for 8 hours in a nitrogen atmosphere with shaking to give a trunk polymer.

| | |
|---|---|
| Chloromethylstyrene (CMS) | 5 g |
| 2-Ethylhexyl methacrylate (2-EHMA) | 90 g |
| Maleic anhydride (MAN) | 9 g |
| Diethyl succinate | 100 g |
| tert-Butyl peroxypivalate (PERBUTYL PV, manufactured by NOF Corp.) | 4 g |

After the completion of the reaction, a monomer consumption ratio determined by a gas chromatography was 100%.

(Second Step: Polymerization of Branch Polymer)

Then, the following ingredients were added to the trunk polymer solution.

| | |
|---|---|
| FA | 100 g |
| 2-Ethylhexyl methacrylate (2-EHMA) | 10 g |
| Coprous chloride | 3 g |
| Bipyridyl | 10 g |
| Mineral turpentine | 100 g |

The reaction was conducted at 110° C. for 8 hours in a nitrogen atmosphere with shaking, to give a graft copolymer having the branch polymer bonded to the trunk polymer. After the reaction, a monomer consumption ratio determined by a gas chromatography was 100%.

The mixture was adjusted by diluting with mineral turpentine to a solid content of 15 % by weight. 10 % by weight of active carbon was added to the solution. After shaking at room temperature for 2 hours, active carbon was filtered off by filter paper.

An Emission spectrometer using an inductively coupled plasma (ICP) revealed that copper did not remain in the resultant filtrate. A GPC revealed that a number average molecular weight of the resultant graft polymer was 11,200.

The water- and oil-repellency, the product stability and the dilution stability of the resultant polymer solution were determined. The results are shown in Table 10.

EXAMPLES 12 and 13

The same procedure as in Example 11, was repeated to polymerize monomers shown in Table 5.

The monomer consumption ratio after the reaction in each step of preparing a trunk polymer and a branch polymer, determined by a gas chromatography was 100%.

A GPC revealed that the resultant graft polymers had a number average molecular weight of 9,600 in Example 12 and 10,900 in Example 13.

TABLE 5

| | Used ingredients (g) | | | | | | |
|---|---|---|---|---|---|---|---|
| | First step polymerization (trunk polymer) | | | | Second step polymerization (branch polymer) | | |
| | CMS | 2-EHMA | FA | MAN | FA | 2-EHMA | MAN |
| Ex. 11 | 5 | 90 | — | 9 | 100 | 10 | — |
| Ex. 12 | 5 | 95 | — | 4 | 100 | 5 | 5 |
| Ex. 13 | 5 | 85 | 5 | 9 | 100 | 10 | — |

COMPARATIVE EXAMPLES 1 to 4

The same procedure as in Examples 1 and 2 was repeated to polymerize monomers shown in Table 6.

The monomer consumption ratio after the reaction in a step of preparing each of a branch polymer and a graft copolymer, determined by a gas chromatography was 100%. An NMR analysis revealed that a composition ratio (molar ratio) of respective ingredients in the branch polymer was mercaptoethanol:FA:StMA=1.0:4.7:0.9 in Comparative Example 1, mercaptoethanol:FA:StMA=1.0:4.8:0.6 in Comparative Example 2, mercaptoethanol:FA:2-EHMA=1.0:5.1:1.5 in Comparative Example 3, and mercaptoethanol:FA:StMA=1.0:4.8:0.7 in Comparative Example 4.

After the completion of the reaction for preparing a macromonomer, an NCO absorption of an IR spectrum nearly disappeared. A GPC revealed that the resultant graft polymers had a number average molecular weight of 8,600 in Comparative Example 1, a number average molecular weight of 8,500 in Comparative Example 2, a number average molecular weight of 8,000 in Comparative Example 3, and a number average molecular weight of 9,400 in Comparative Example 4.

The water- and oil-repellency, the product stability and the dilution stability of the resultant polymer solutions were determined. The results are shown in Table 11.

TABLE 6

| | Branch polymer | | | | | Trunk polymer | | |
|---|---|---|---|---|---|---|---|---|
| | Macromonomer | | | | | | | |
| | mercaptoethanol | FA | StMA | 2-EHMA | 2-isocyanatoethyl methacrylate | isocyanate group-containing vinyl monomer (a) | 2-EHMA | HEMA |
| Com. Ex. 1 | 3 | 95 | 5 | — | 9 | — | 110 | — |
| Com. Ex. 2 | 3 | 95 | 5 | — | — | 38 | 110 | — |
| Com. Ex. 3 | 3 | 95 | — | 5 | 9 | — | 110 | — |
| Com. Ex. 4 | 3 | 95 | 5 | — | 9 | — | 100 | 10 |

Note)
HEMA: Hydroxyethyl methacrylate

COMPARATIVE EXAMPLES 5 to 7

The same procedure as in Example 7 was repeated to polymerize monomers shown in Table 7.

The monomer consumption ratio after the reaction in a step of preparing each of a branch polymer and a graft copolymer, determined by a gas chromatography was 100%. An NMR analysis revealed that a composition ratio (molar ratio) of respective ingredients in the branch polymer was mercaptoacetic acid:FA:StMA=1.0:6.0:1.3 in Comparative Example 5, mercaptoacetic acid:FA:2-EHMA=1.0:6.4:2.2 in Comparative Example 6, and mercaptoacetic acid:FA:StMA=1.0:6.9:1.5 in Comparative Example 7.

After the reaction for preparing a macromonomer, a reaction ratio of glycidyl methacrylate determined by a gas chromatography was 100%. A GPC revealed that the resultant graft polymers had a number average molecular weight of 9,100 in Comparative Example 5, a number average molecular weight of 8,600 in Comparative Example 6 and a number average molecular weight of 8,900 in Comparative Example 7.

The water- and oil-repellency, the product stability and the dilution stability of the resultant polymer solutions were determined. The results are shown in Table 11.

TABLE 7

| | Branch polymer | | | | | Trunk polymer | |
|---|---|---|---|---|---|---|---|
| | Macromonomer | | | | | | |
| | mercapto-acetic acid | FA | StMA | 2-EHMA | GMA | 2-EHMA | HEMA |
| Com. Ex. 5 | 3 | 95 | 5 | — | 5 | 110 | — |
| Com. Ex. 6 | 3 | 95 | — | 5 | 5 | 110 | — |
| Com. Ex. 7 | 3 | 95 | 5 | — | 5 | 100 | 10 |

COMPARATIVE EXAMPLES 8 and 9

The same procedure as in Example 11 was repeated to polymerize monomers shown in Table 8.

The monomer consumption ratio after the reaction in a step of preparing each of a trunk polymer and a branch polymer, determined by a gas chromatography was 100%.

A GPC revealed that the resultant graft polymers had a number average molecular weight of 11,600 in 15Comparative Example 8 and a number average molecular weight of 12,300 in Comparative Example 9.

The water- and oil-repellency, the product stability and the dilution stability of the resultant polymer solutions were determined. The results are shown in Table 11.

TABLE 8

| | Used ingredients (g) | | | | |
|---|---|---|---|---|---|
| | First step polymerization (trunk polymer) | | | Second step polymerization (branch polymer) | |
| | CMS | 2-EHMA | HEMA | FA | 2-EHMA |
| Com. Ex. 8 | 5 | 99 | — | 100 | 10 |
| Com. Ex. 9 | 5 | 90 | 9 | 100 | 10 |

COMPARATIVE EXAMPLES 10

1.0 Equivalent of 2-isocyanatoethyl methacrylate and 0.7 equivalents of mercaptoethanol were reacted in the presence of 0.1% by weight of dibuthyltin dilaurate in ethyl acetate at 50° C. for 12 hours.

Then, 5.5 g of the reaction product (the product of reaction between the isocyanate group-containing vinyl monomer and mercaptoethanol) and the following ingredients were charged into a 1000 mL glass polymerization reactor, and reacted in a nitrogen atmosphere with shaking at 75° C. for 8 hours to give a polymer.

| | |
|---|---|
| FA | 42.7 g |
| Stearyl methacrylate (StMA) | 2.3 g |
| 2-Ethylhexyl methacrylate (2-EHMA) | 45.0 g |

-continued

| Maleic anhydride (MAN) | 4.5 g |
|---|---|
| Ethyl acetate | 515 g |
| tert-Butyl peroxypivalate | 9 g |

A GPC revealed that the resultant random polymer had a number average molecular weight of 15,000.

The water- and oil-repellency, the product stability and the dilution stability of the resultant polymer solution were determined. The results are shown in Table 11.

COMPARATIVE EXAMPLES 11

The same procedure as in Example 10 was repeated to polymerize monomers shown in Table 9.

A GPC revealed that the resultant random polymer had a number average molecular weight of 13,400.

The water- and oil-repellency, the product stability and the dilution stability of the resultant polymer solution were determined. The results are shown in Table 11.

COMPARATIVE EXAMPLES 12

1.0 Equivalent of 2-glycidyl methacrylate and 0.7 equivalents of mercaptoethanol were reacted in the presence of 0.1% by weight of N,N-dimethyllaurylamine in ethyl acetate at 50° C. for 12 hours.

Then, 3.7 g of the reaction product (the product of reaction between glycidyl methacrylate and mercaptacetic acid) and the following ingredients were charged into a 1000 mL glass polymerization reactor, and reacted in a nitrogen atmosphere with shaking at 75° C. for 8 hours to give a polymer.

| FA | 43.5 g |
|---|---|
| Stearyl methacrylate (StMA) | 2.3 g |
| 2-Ethylhexyl methacrylate (2-EHMA) | 46.0 g |
| Maleic anhydride (MAN) | 4.6 g |
| Ethyl acetate | 515 g |
| tert-Butyl peroxypivalate | 9 g |

A GPC revealed that the resultant random polymer had a number average molecular weight of 14,500.

The water- and oil-repellency, the product stability and the dilution stability of the resultant polymer solution were determined. The results are shown in Table 11.

COMPARATIVE EXAMPLES 13

The following ingrediens were charged into 1000 mL glass polymerization reactor and reacted in a nitrogen atmosphere with shaking at 75° C. for 8 hours to give a polymer.

| FA | 46.7 g |
|---|---|
| 2-Ethylhexyl methacrylate (2-EHMA) | 46.7 g |
| Maleic anhydride (MAN) | 4.3 g |
| Chloromethylstyrene (CMS) | 2.3 g |
| Ethyl acetate | 515 g |
| tert-Butyl peroxypivalate | 9 g |

A GPC revealed that the resultant random polymer had a number average molecular weight of 13,600.

The water- and oil-repellency, the product stability and the dilution stability of the resultant polymer solution were determined. The results are shown in Table 11.

TABLE 9

| | Used ingredients (g) | | | | | | |
|---|---|---|---|---|---|---|---|
| | FA | StMA | 2-EHMA | MAN | Compound from reaction between 2-isocyanatoethyl methacrylate and mercaptoethanol | Compound from reaction between GMA and mercaptoacetic acid | CMS |
| Com. Ex. 10 | 42.7 | 2.3 | 45.0 | 4.5 | 5.5 | — | — |
| Com. Ex. 11 | 42.7 | — | 47.3 | 4.5 | 5.5 | — | — |
| Com. Ex. 12 | 43.5 | 2.3 | 46.0 | 4.6 | — | 3.7 | — |
| Com. Ex. 13 | 46.7 | — | 46.7 | 4.3 | — | — | 2.3 |

TABLE 10

| | Water repellency | | Oil repellency | | Product stability | | |
|---|---|---|---|---|---|---|---|
| | Polyester | Cotton | Polyester | Cotton | In aromatic-containing solvent | In non-aromatic solvent | Dilution stability |
| Ex. 1 | 5 | 5 | 5 | 6 | ○ | ○ | ○ |
| Ex. 2 | 5 | 5 | 5 | 6 | ○ | ○ | ○ |
| Ex. 3 | 5 | 5 | 4 | 6 | ○ | ○ | ○ |
| Ex. 4 | 5 | 5 | 4 | 6 | ○ | ○ | ○ |
| Ex. 5 | 5 | 5 | 5 | 6 | ○ | ○ | ○ |
| Ex. 6 | 5 | 5 | 4 | 6 | ○ | ○ | ○ |
| Ex. 7 | 5 | 5 | 5 | 6 | ○ | ○ | ○ |
| Ex. 8 | 4 | 5 | 4 | 6 | ○ | ○ | ○ |
| Ex. 9 | 5 | 5 | 5 | 6 | ○ | ○ | ○ |
| Ex. 10 | 5 | 5 | 4 | 6 | ○ | ○ | ○ |
| Ex. 11 | 5 | 5 | 8 | 8 | ○ | ○ | ○ |
| Ex. 12 | 5 | 5 | 7 | 7 | ○ | ○ | ○ |
| Ex. 13 | 4 | 5 | 8 | 7 | ○ | ○ | ○ |

TABLE 11

| | Water repellency | | Oil repellency | | Product stability | | |
|---|---|---|---|---|---|---|---|
| | Polyester | Cotton | Polyester | Cotton | In aromatic-containing solvent | In non-aromatic solvent | Dilution stability |
| Com. Ex. 1 | 5 | 3 | 2 | 2 | Δ | x | x |
| Com. Ex. 2 | 5 | 3 | 2 | 3 | Δ | Δ | ○ |
| Com. Ex. 3 | 4 | 3 | 2 | 2 | Δ | x | x |
| Com. Ex. 4 | 3 | 3 | 3 | 3 | x | x | x |
| Com. Ex. 5 | 2 | 2 | 0 | 0 | Δ | x | x |
| Com. Ex. 6 | 2 | 2 | 0 | 0 | Δ | x | x |
| Com. Ex. 7 | 3 | 2 | 0 | 0 | Δ | x | x |
| Com. Ex. 8 | 5 | 3 | 4 | 3 | ○ | Δ | Δ |
| Com. Ex. 9 | 5 | 3 | 4 | 4 | ○ | x | x |
| Com. Ex. 10 | 2 | 1 | 1 | 1 | x | x | x |
| Com. Ex. 11 | 2 | 1 | 2 | 1 | x | x | x |
| Com. Ex. 12 | 1 | 1 | 2 | 1 | x | x | x |
| Com. Ex. 13 | 1 | 1 | 2 | 1 | x | x | x |

Effect of the Invention

The graft copolymer has excellent solubility in a petroleum solvent and excellent water repellency due to the improved adhesion to fibers caused by polarity possessed by anhydride structure, since the cyclic acid anhydride is introduced to the graft copolymner.

What is claimed is:

1. A solvent-based water- and oil-repellent agent composition comprising:
   a graft copolymer comprising a repeating unit derived from a vinyl monomer having a perfluoroalkyl group and a repeating unit derived from a polymerizable cyclic acid anhydride, and
   an organic solvent.

2. The water- and oil-repellent agent composition according to claim 1, wherein, in the graft copolymer, a trunk polymer is composed of:
   (A) optionally present, a vinyl monomer having a perfluoroalkyl group,
   (B) optionally present, a fluorine-free vinyl monomer,
   (C) optionally present, a polymerizable cyclic acid anhydride, and
   (D) a vinyl monomer having a group bonding to a branch polymer, and
   a branch polymer is composed of:
   (E) optionally present, a vinyl monomer having a perfluoroalkyl group,
   (F) optionally present, a fluorine-free vinyl monomer, and
   (G) optionally present, a polymerizable cyclic acid anhydride,
   wherein at least one of the components (A) and (E) is an essential component, and at least one of the components (C) and (G) is an essential component.

3. The water- and oil-repellent agent composition according to claim 2, wherein the total amount of the components (A) and (B) is from 10 to 75 parts by weight, the total amount of the components (B) and (F) is from 0 to 89.8 parts by weight, the amount of the component (D) is from 0.1 to 10 parts by weight, and the total amount of the components (C) and (G) is from 0.1 to 89.9 parts by weight, based on 100 parts by weight of the graft copolymer.

4. The water- and oil-repellent agent composition according to claim 1, wherein the polymerizable cyclic acid anhydride has a carbon-carbon double bond copolymerizable with the vinyl monomer and at least one intramolecular cyclic carboxylic anhydride structure in one molecule.

5. The water- and oil-repellent agent composition according to claim 2, wherein the bonding group in the vinyl monomer (D) having the group bonding to the branch polymer is an NCO group, a glycidyl group, an acid chloride group and/or a halomethyl group.

6. A graft copolymer for a water- and oil-repellent agent comprising a repeating unit derived from a vinyl monomer having a perfluoroalkyl group and a repeating unit derived from a polymerizable cyclic acid anhydride, wherein a trunk polymer is composed of:
   (A) optionally present, a vinyl monomer having a perfluoroalkyl group,
   (B) optionally present, a fluorine-free vinyl monomer,
   (C) optionally present, a polymerizable cyclic acid anhydride, and
   (D) a vinyl monomer having a group bonding to a branch polymer, and
   a branch polymer is composed of:
   (E) optionally present, a vinyl monomer having a perfluoroalkyl group,
   (F) optionally present, a fluorine-free vinyl monomer, and
   (G) optionally present, a polymerizable cyclic acid anhydride,
   wherein at least one of the components (A) and (E) is an essential component, and at least one of the components (C) and (G) is an essential component.

7. The graft copolymer according to claim 6, wherein wherein the bonding group in the vinyl monomer (D) having the group bonding to the branch polymer is an NCO group, a glycidyl group, an acid chloride group and/or a halomethyl group.

8. The water- and oil-repellent agent composition according to claim 1, wherein said organic solvent comprises a hydrocarbon solvent.

9. The water- and oil-repellent agent composition according to claim 1, wherein said organic solvent comprises a petroleum solvent.

10. The water- and oil-repellent agent composition according to claim 1, wherein the repeating unit derived from a polymerizable cyclic acid anhydride has a closed ring structure.

11. The graft copolymer according to claim 7, wherein the repeating unit derived from a polymerizable cyclic acid anhydride has a closed ring structure.

* * * * *